C. J. NASH.
FRICTION DRAFT RIGGING.
APPLICATION FILED AUG. 19, 1907.

931,955.

Patented Aug. 24, 1909.
2 SHEETS—SHEET 1.

Witnesses:
Wm. Geiger
H. W. Munday

Inventor:
Charles J. Nash
By Munday, Evarts, Adcock & Clark.
Attorneys

C. J. NASH.
FRICTION DRAFT RIGGING.
APPLICATION FILED AUG. 19, 1907.
931,955.
Patented Aug. 24, 1909.
2 SHEETS—SHEET 2.
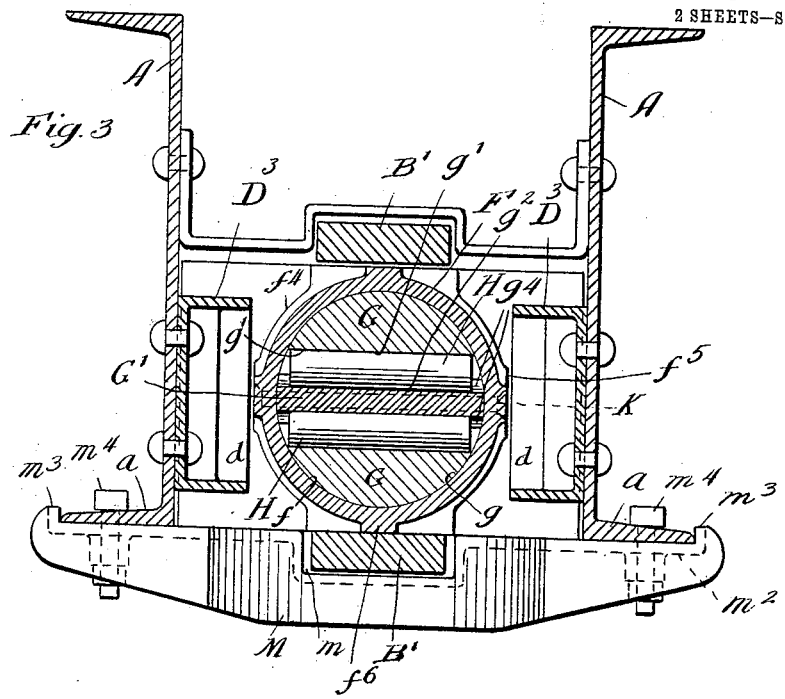
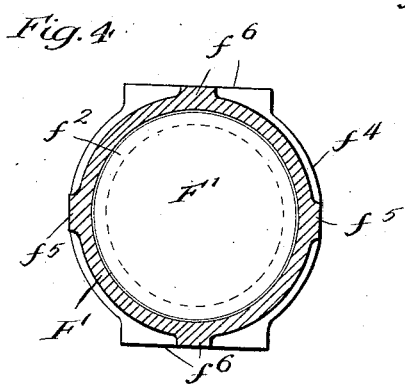
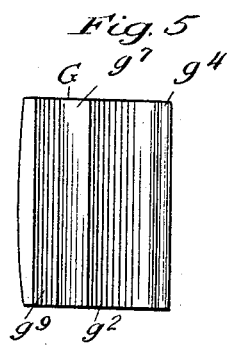
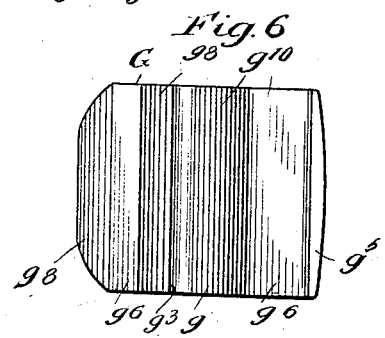

UNITED STATES PATENT OFFICE.

CHARLES J. NASH, OF CHICAGO, ILLINOIS, ASSIGNOR TO W. H. MINER COMPANY, OF CHICAGO, ILLINOIS, A CORPORATION OF ILLINOIS.

FRICTION DRAFT-RIGGING.

931,955.　　　　Specification of Letters Patent.　　Patented Aug. 24, 1909.

Application filed August 19, 1907. Serial No. 389,162.

*To all whom it may concern:*

Be it known that I, CHARLES J. NASH, a citizen of the United States, residing in Chicago, in the county of Cook and State of Illinois, have invented a new and useful Improvement in Friction Draft-Rigging, of which the following is a specification.

My invention relates to friction draft rigging for railway cars.

The object of my invention is to provide a friction spring draft rigging of a simple, strong, safe, efficient and durable construction, having both a direct acting spring cushioning member longitudinally arranged in the line of the draw bar, and frictional cushioning devices with longitudinally extending friction faces parallel to the draw bar in which the frictional devices will operate with certainty and uniformly, smoothly, evenly and with regularity and reliability, both in compressing and releasing and without danger of sticking, and by means of which the objections heretofore experienced in the practical operation of friction draft rigging may be overcome.

To practically accomplish this result, and herein my invention consists, I combine with the draw bar, followers, front, rear and intermediate stops, the spring and friction devices, (the latter comprising a longitudinally movable friction shell, friction blocks within the shell, and a wedge or spreader block and anti-friction rollers interposed between the wedge and friction blocks), a movable follower block which is interposed between the spring and the rear follower, so that a limited preliminary compression of the spring may take place before the longitudinally movable friction shell engages the rear follower, and so that in releasing a slight expansion of the spring may take place without necessitating the movement of the friction devices in respect to each other. By the combination of these parts together I have discovered and demonstrated by my experiments that the objections and difficulties heretofore experienced in the practical operation of friction spring draft rigging may be effectually overcome.

Figure 1:
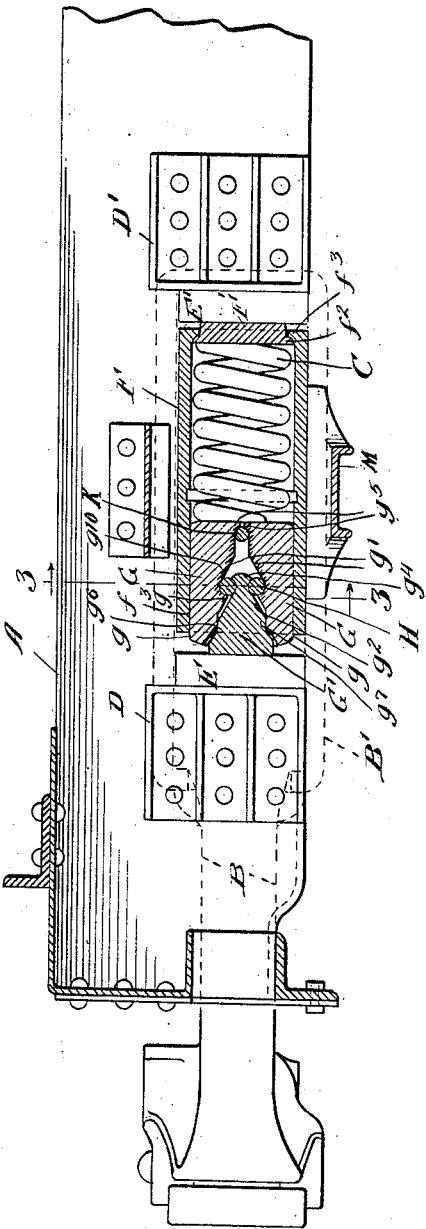
Figure 2:
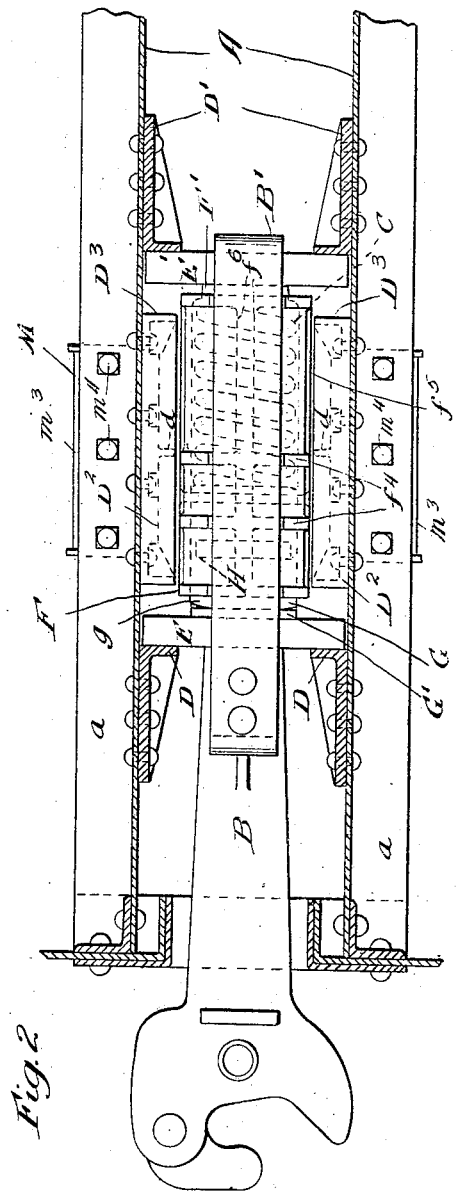

In the accompanying drawing, forming a part of this specification, Figure 1 is a central vertical longitudinal section of a direct acting friction spring draft rigging embodying my invention; Fig. 2 is a plan view, partly in horizontal section; Fig. 3 is a vertical cross section on line 3—3 of Fig. 1; Fig. 4 is a detail cross section of the friction shell; Fig. 5 is a detail face or plan view of the wedge or spreader block, and Fig. 6 is a detail face or plan view of one of the friction blocks.

In the drawing A represents the center sills or other frame pieces of the car to which the draft rigging is applied.

B is the draw bar, $B^1$ its yoke, C a longitudinally arranged direct acting draft rigging spring. D $D^1$ front and rear stops, $D^2$ $D^3$ intermediate stops; E $E^1$ front and rear followers.

F is the longitudinally movable friction shell, preferably cylindrical in form, having an interior longitudinally extending friction face $f$; and G G are longitudinally movable friction blocks within the shell F and having longitudinally extending exterior friction faces $g$ $g$ in sliding frictional engagement with the interior friction face of the friction shell F.

$G^1$ is the wedge between the friction blocks G G. The friction blocks G have inclined or wedging faces $g^1$ which coöperate with the corresponding inclined or wedging faces $g^2$ of the wedge $G^1$ and the interposed friction rollers H, which have a rolling contact on the wedging faces $g^1$ $g^2$ of both the friction blocks G G and the wedge $G^1$ to prevent any tendency of the wedges and friction blocks from sticking. The friction blocks G G are also furnished with curved shoulders $g^3$ which coöperate with corresponding shoulders $g^4$ on the wedge $G^1$ to hold or keep the anti-friction rollers H H in place while permitting the same to roll freely on the inclined or wedging faces $g^1$ $g^2$ of the friction blocks G and wedge $G^1$. The friction blocks G are further provided with retaining shoulders $g^5$, which engage a transversely extending pin or rivet K secured to the friction shell F and adapted to engage said shoulders $g^5$ on the friction blocks G when the spring C is expanded to its full extent, thus preventing the friction blocks G from being entirely removed from the friction shell F. The coöperating shoulders $g^4$ on the wedge $G^1$ which engage the anti-friction rollers H in connection with the roller engaging shoulders $g^3$ on the friction blocks also hold the wedge $G^1$ in its assembled position within the shell F. The friction blocks G and wedge $G^1$ are also preferably furnished with longitudinal parallel faces $g^6$ $g^7$ and tapering faces $g^8$ $g^9$.

$F^1$ is a movable follower or bearing block for the rear end of the spring, interposed between the rear follower $E^1$ and the rear end of the spring, and projecting through and closing the rear end of the friction shell F. The bearing block $F^1$ is movable in respect to the friction shell F to a limited extent, so as to provide for limited preliminary compression of the spring C before the friction devices come into action. The movable bearing block $F^1$ is furnished with a flange or shoulder $f^2$ engaging a corresponding flange or shoulder $f^3$ at the rear end of the friction shell F.

To strengthen the friction shell it is provided with circular ribs $f^4$ and longitudinal guide ribs $f^5$ $f^5$ $f^6$ $f^6$, the upper and lower longitudinal ribs $f^6$ $f^6$ engaging the draw bar yoke, and the upright or side longitudinal ribs $f^5$ $f^5$ engaging or fitting between the external guides $d$ $d$, one on each side, which are secured to or form part of the intermediate stops $D^2$ $D^3$.

In the drawing I have illustrated the front and rear stops D $D^1$ in separate pieces from the intermediate stops $D^2$ $D^3$, but all these stops or abutment shoulders may be made in one stop casting, if preferred. The friction blocks G preferably have chilled or hardened portions $g^{10}$ extending preferably to the depth of a quarter of an inch or such matter from the friction faces and wearing portions of the friction blocks. As each friction block G has only one stop or roller engaging shoulder for the anti-friction roller H, the roller is thus free to turn with a rolling action or movement on the friction block; and as the coöperating wedge block $G^1$ also has on each of its inclined or wedging faces only one stop shoulder for the roller H to engage, it leaves the roller free to turn with a rolling movement on the inclined or wedging faces of the wedge also. The rollers H H thus have a true rolling or anti-friction action in coöperation with the wedge and friction blocks, and thus cause the friction devices to act with certainty and efficiency and reliability and without danger of sticking, and as intermediate stops are provided to limit the movement of the followers and the compression of the springs independent of the longitudinally movable friction shell F, this friction shell is entirely relieved and protected from the blows of the draw bar and prevented from being upset, compressed or shortened in length thereby.

M is the lower tie or guide plate which supports and guides the friction shell as well as the draw bar extension or yoke $B^1$ and the draft rigging as a whole. This tie or guide plate is preferably furnished with a central longitudinal channel $m$ to receive the lower limb or member of the draw bar yoke, which receives, supports and guides the friction shell F. The tie plate M also has wings or flanges $m^2$ provided with shoulders $m^3$ to engage the lower flanges $a$ of the center sills or other stationary parts to which the guide or tie plate M is secured by its bolts $m^4$. The wedge faces or inclines $g^1$ on the friction blocks and $g^2$ $g^2$ on the wedge block $G^1$ are preferably at angles of about forty-five degrees.

The movable follower or bearing block F preferably is constructed to give about one-half inch play between the rear follower $D^1$ and the rear end of the friction shell F, thus providing for a one-half inch preliminary compression of the spring before the friction devices come into action under either pulling or buffing strains, or in releasing. By this coöperative combination of parts I secure all the advantages of the friction resistance mechanism in giving high capacity to the draft rigging, and in enabling it to adequately cushion the heavy buffing and pulling blows or strains, while at the same time the draft rigging has greater sensitiveness in cushioning or taking care of the slighter variations of stress or strain which are very numerous and constantly occurring while the train is in motion, and the further important advantage of relieving the friction mechanism from a great amount of unnecessary wear due to the numerous and constantly occurring minor variations in strain or stress.

I do not claim as my invention the draw-bar, stops, followers, spring, friction shell, friction blocks, wedge and antifriction rollers on each side of the wedge, except in combination with the preliminary compression-block F'.

I claim:

1. In a friction draft rigging, the combination with the draw bar and direct acting spring in line with the draw bar, of friction devices in line with the draw bar comprising a friction shell and friction blocks within the shell having wedging faces, an anti-friction roller having a rolling action on both members between which it is interposed, and means for affording a preliminary compression of the spring before the friction devices come into action, said preliminary compression means coacting with said roller to prevent sticking of the friction devices and in producing certain and reliable release action, substantially as specified.

2. In a friction spring draft rigging, the combination with the draw bar, spring and followers, of a friction shell, a longitudinally movable wedge block and friction blocks within the shell, anti-friction rollers between the wedge block and friction blocks, each of said rollers having a rolling action on both members with which it contacts, and a movable bearing block between the spring and one of the followers, said movable bearing block coacting with said rollers to prevent sticking of the friction blocks in the friction shell and in producing certain and reliable release action, substantially as specified.

3. In a friction draft rigging, the combination with the draw bar, longitudinally arranged spring, followers and front, rear and intermediate stops for the followers, of a longitudinally movable friction shell surrounding the spring, a movable follower interposed between the rear follower and the spring and projecting through the rear end of said friction shell, longitudinally movable friction blocks inside said shell, a longitudinally movable wedge block between said friction blocks, anti-friction rollers between said wedge block and said friction blocks, and having a rolling action on both the wedge and friction blocks, said interposed follower coöperating with said rollers in preventing sticking of the friction devices and in producing certain and reliable release action, substantially as specified.

CHARLES J. NASH.

Witnesses:
EDMUND ADCOCK,
H. M. MUNDAY.